United States Patent [19]

Hansen et al.

[11] Patent Number: 5,202,976
[45] Date of Patent: Apr. 13, 1993

[54] METHOD AND APPARATUS FOR COORDINATING MEASUREMENT ACTIVITY UPON A PLURALITY OF EMULATORS

[75] Inventors: John D. Hansen; Arnold S. Berger; Lewis S. Kootstra; Beth V. Jones; Stan W. Bowlin; William Fleck, all of Colorado Springs, Colo.

[73] Assignee: Hewlett-Packard Company, Palo Alto, Calif.

[21] Appl. No.: 718,728

[22] Filed: Jun. 21, 1991

Related U.S. Application Data

[62] Division of Ser. No. 292,590, Dec. 30, 1988, Pat. No. 5,051,888.

[51] Int. Cl.[5] .................. G06F 15/16; G06F 9/00; G06F 11/30
[52] U.S. Cl. .................. 395/500; 364/229; 364/230; 364/232.3; 364/260; 364/DIG. 1
[58] Field of Search .................. 395/500, 375

[56] References Cited

U.S. PATENT DOCUMENTS

| | | | |
|---|---|---|---|
| 3,891,974 | 6/1975 | Coulter et al. | 395/500 |
| 4,370,709 | 1/1983 | Fosdick | 395/500 |
| 4,447,876 | 5/1984 | Moore | 395/500 |
| 4,638,423 | 1/1987 | Ballard | 395/500 |
| 4,780,819 | 10/1988 | Kashiwagi | 395/500 |
| 4,782,461 | 11/1988 | Mick et al. | 395/500 |

OTHER PUBLICATIONS

A. Berger "Foreground/background monitor increases Deu. Sys. Transf." *Personal Engineering & Instrumentation News*, Feb. 1988.

A. Berger "Host Indep. Micropr. Deu. System" *Hewlett & Packard Journal*, vol. 39, No. 6, Dec. 1988.

W. Fischer "Host Indep. Emulator Software Architecture" *Hewlett & Packard Journal*, vol. 39, No. 6, Dec. 1988.

*Primary Examiner*—Thomas C. Lee
*Assistant Examiner*—Ayni Mohamed
*Attorney, Agent, or Firm*—Edward L. Miller

[57] ABSTRACT

A system for coordinating the measurement activity of a plurality of emulators and their associated internal analyzers uses a bus with three signal lines. A READY signal is set false by any emulator that initiates a break (a transition from running user code to running a monitor). The READY signal is set false by the breaking emulator at the very beginning of its break, without waiting for the resumption of the monitor program. The false ready signal is detected immediately by the other emulators, which then break in sympathy. The READY signal is further used to restart all emulators in unison. The emulator that initiated the break remains running its monitor, while the others start their monitors, determine that they did not cause the break, and then in anticipation of a restart, essentially suspend their monitors and prepared to start running user code. As each emulator becomes ready it releases the READY signal. As the last emulator becomes ready, it too releases READY, which then does true. At this all emulators complete their escape from their monitors (which for each of them amounts to just an instruction fetch, or so) and resume execution of their user code.

1 Claim, 4 Drawing Sheets

METHOD AND APPARATUS FOR COORDINATING MEASUREMENT ACTIVITY UPON A PLURALITY OF EMULATORS

REFERENCE TO RELATED PATENT

This is a co-pending division of application Ser. No. 07/292,590, filed Dec. 30, 1988, entitled DATA PROCESSING SYSTEMS FOR COORDINATING MEASUREMENT ACTIVITY UPON A PLURALITY OF EMULATORS, assigned to Hewlet-Packard Co. and since issued on Sep. 24, 1991, as U.S. Pat. No. 5,051,888.

BACKGROUND OF THE INVENTION

Sophisticated microprocessor development systems use a technique called "emulation" which is accomplished by an "emulator." An emulator contains a substitute microprocessor and associate electronics that is used in place of the ultimately intended microprocessor. Typically, the target system's microprocessor is removed, and in its place a cable having a suitable probe inserted into the socket. The cable and the probe connect the target system to the emulation hardware. Within the emulator is an emulation microprocessor that is a high speed version of what is otherwise of the same type as the target processor, although once in a while the emulation processor will be a slightly modified version of the commercially available customer version (certain additional internal signals might be brought out to better indicate internal activities). The emulation processor is embedded in suitable control circuitry to allow it to be started, stopped, and to allow its internal registers to be inspected or changed. It is also common for emulators to provide a means to select whether the emulator processor executes the target system's code from memory actually located in the target system, or instead from memory located within the emulator itself.

A modern emulator for a powerful state of the art microprocessor is a complicated affair, and the facilities required to investigate or alter the contents of the target system's executable code, set breakpoints, do single stepping, report on and change internal register contents, etc., generally require the assistance of a mechanism dedicated to just such purposes. That mechanism is called a monitor, and it is typically a miniature special purpose operating system assisted by some dedicated hardware. In the most powerful architectures the emulation mechanism is accompanied by an internal logic state analyzer, and perhaps even by a timing analyzer. The overall control of these separate but integrated functions exceeds the scope of the monitor, and is frequently accomplished by yet another microprocessor which we shall be content to call the "controller." The controller gets its commands from, and reports status and data to, a conventional terminal, or perhaps yet another computer. We shall not distinguish here between the two; whichever one it is is simply the "user," "host" or the "operator."

Microprocessor development systems incorporating emulation as described above became available shortly after microprocessors appeared on the scene. Initially, the typical system under development used only a single microprocessor, so there was little need for an emulator to be congenial and cooperate with another instance of itself. But the microprocessor is now ubiquitous, and even the top of the line models are small and inexpensive in comparison to what was required to accomplish the same functions only a decade ago. As a result, microprocessors are showing up in parallel processing architectures, as well as in many applications outside of traditional "computing." They are being used in embedded systems that control voltmeters, digital oscilloscopes, logic analyzers, emulators, and in various forms of very large scale systems that incorporate a variety of machinery and equipment, both manned and unmanned, e.g., high performance aircraft and robotic mechanisms. Such a large scale system may incorporate a substantial number of (say, a dozen or more) microprocessors to control its major and minor subsystems. The subsystems need to coordinate their activities; that is, the various microprocessors in the finished system need to communicate commands, status and data. Structured design and disciplined programming notwithstanding, this is positively fertile ground for bugs. A microprocessor development system that is intended for use in a single processor environment lacks the tools to efficiently assist in tracking down bugs whose mechanisms involve interaction between two or more subsystems and their controlling processors. What good does it do, for example, to bring one emulation processor to a halt immediately at the behest of its associated state analyzer (or as a result of some other resource available locally within that emulation/analyzer combination) when it may take several hundred or a thousand instructions cycles of the other emulators to get them stopped. The longer they run the less clear is the picture of the conditions surrounding the event of interest.

There are some prior art emulators that can be stopped only by detection of events internal to the emulator, or by receipt of an operator issued "stop" command, as from a keyboard. That is, these emulators do not contemplate at all the notion of stopping in response to a signal originating with another emulator or separate analysis instrument.

The problem is that conventional emulator architecture is not agile; it takes it a long time (measured in processor instruction cycles) to get the emulator going, and a long time to get it stopped. The emulator and its controller represent a substantial software engine in its own right, and its attention must first be gained before any starting and stopping can be done. Next, there can be a substantial amount of emulation overhead that necessarily accompanies starting and stopping, no matter how quickly the controller responds. Furthermore, prior art emulator-to-emulator communications mechanisms have operated at a relatively high level, i.e., mailboxes and semaphores. No wonder by the time all the emulation processors get stopped in response to some event of interest, the user is extremely lucky to be able to glean any useful knowledge about what was really going on at the time the event occurred. What is needed is a way to politely but immediately bring all the processors to a halt, so that the tracks of the culprit are not covered by subsequent operation.

A similar but related problem attends the task of getting all the processors in a target system started at the same time with variable selected internal conditions for the various subsystems. One way this can be accomplished is to get all of the emulators running (which may require visiting each emulator) while holding the all of the target processors' RESET lines in the active state, and then simultaneously releasing those RESET lines. This does get all of the subsystems running from known initial conditions. Unfortunately, it may well *not be* the desired initial conditions, and it may require a great deal of subsequent work to bring those desired conditions into being.

In several prior art systems, getting the various emulators to begin a test with each subsystem in a particular location or state (the initial conditions for some test) has required the operator or his assistants to physically walk over to each emulator and manipulate its keyboard to get the emulator going and then do whatever is necessary to establish the desired initial conditions within the subsystem.

Not only does this lack of emulator agility make process synchronism difficult, but it also makes it nearly impossible to meaningfully resume system activity after an interruption (a pause, continue, pause, continue, ... type operation). What is needed is a way of getting all the processors in the target system going either from wherever they are or from some selected starting points, with a minimum of variation of the points in time when each subsystem resumes execution of its used code.

Compounding this situation is a trend in the architecture of high performance multi-processor embedded systems: tight coupling. The designers of such systems are well aware that the use of formal I/O channels for semaphores and mail boxes, all handled by firmware, can be time consuming bottle necks. Other designs are sought, such as ones that share common data in multi-port memories. With these types of designs the awkwardness of the conventional emulator in dealing with other emulators further compounds the task of debugging the system.

SUMMARY OF THE INVENTION

The use of multiple emulators in multi-processor computer architectures or multi-processor embedded systems, and especially in those embedded system where the subsystems are tightly coupled, is significantly enhanced by incorporating a four-state model into the emulator/monitor combination, and by equipping each emulator with a high speed Coordinated Measurement Bus (CMB) for rapid and direct emulator-to-emulator interaction. When one of the emulators begins the process of ceasing to execute the user's code and re-entering the monitor (a break) that emulator *immediately* signals, via the CMB, to all other emulators and interested analysis mechanisms that a break in *just this instant* getting underway. The emulator initiating the break *does not wait* until the monitor is again functional and *then* let the monitor send a *break-has-been-performed* message. This immediate communication, sent via the CMB, accounts for one of the two extra states that the four-state model has over and above the two-state model. The immediate communication of a break means that the other emulators can begin their breaks sooner, thus preserving more accurate pictures of conditions within the other subsystems at the time of the break. Of course, the way the other (which is to say, each) emulator treats the incoming break-is-occurring information (which can be a simple transition of a single CMB_RDY signal on one wire) is to logically OR that incoming external event with any of the other internal events that it would ordinarily use to precipitate its own break.

The remaining extra state in the four-state model deals with getting emulators started more nearly in unison. The idea is to have every emulator do all of the things that it has to in order get out of the monitor and begin executing the user's code, save for the very last few instructions needed to fall through out of the bottom of the monitor and start executing the user's code. An emulator that is so poised can be said to be "ready," and is in the remaining, or second, extra state. Execution of the last fall through section is contingent upon all emulators becoming "ready." A wire AND on a single line (which may the same single CMB_RDY line mentioned above for signalling breaks) may be used to signal all emulators that every emulator has reached the ready state. This allows the signal line to go true, which in turn releases all emulators to begin, in unison, the execution of their user code. Note that there is no requirement for each of the emulators to be for the same type of processor; one might be for an 8-bit machine, while another is for a 32-bit machine. It is very probable that each will require a different length of time between beginning to leave the monitor and reaching the ready state. It is these differing lengths of time following a command to leave the monitor and go run user code that foils synchronization based solely upon the issuance of such a command.

Traditional emulator design has incorporated a two-state model for emulator transition into and out of the monitor. This is the slow and awkward method discussed in the Background of the Invention. The four-state model does not dispense with the overhead, but inserts extra control states into the transitions in cooperation with events signalled by the CMB. The extra transitions decouple each emulator from the differing amounts of overhead in each of the other emulators for entering and leaving the monitor (and the user's code).

The CMB includes another signal (CMB_EXEC) whose assertion signals each emulator that it is to get into the monitor, establish certain initial conditions, wait until all emulators are ready, and then begin running user code. The initial conditions are preselectable, and may vary from emulator to emulator. This same CMB_EXEC signal may also be used to change the meaning of another signal ($\overline{\text{CMB\_TRIG}}$) generated by an analyzer and ordinarily used to trigger another analyzer or cause a break within an emulator. Subsequent to CMB_EXEC but prior to CMB_RDY the meaning of Subsequent to CMB_EXEC but prior to CMB_RDY the meaning of CMB_TRIG may be redefined to allow it to be held down while all analyzers are reprogrammed. While $\overline{\text{CMB\_TRIG}}$ is thus held down no analyzer runs (i.e., none attempts to actually make a measurement). Once all analyzers are properly configured $\overline{\text{CMB\_TRIG}}$ is released. This puts $\overline{\text{CMB\_TRIG}}$ back into its normal mode, which is a bi-directional line that all analyzers share to tell each other and the emulators that some analyzer has "triggered." What "triggered" means in any given measurement scenario is dependent upon how the analyzer was configured.

Thus, the signals within the CMB provide a means for coordinating the transitions of a multiplicity of emulators around their associated individual instances of the four-state model, for facilitating system restarts from selected conditions, and for allowing analysis or measurement mechanisms coupled to one emulator to influence (trigger) events or conditions in one or more other emulators connected to the CMB.

DESCRIPTION OF A PREFERRED EMBODIMENT

Figure 1:
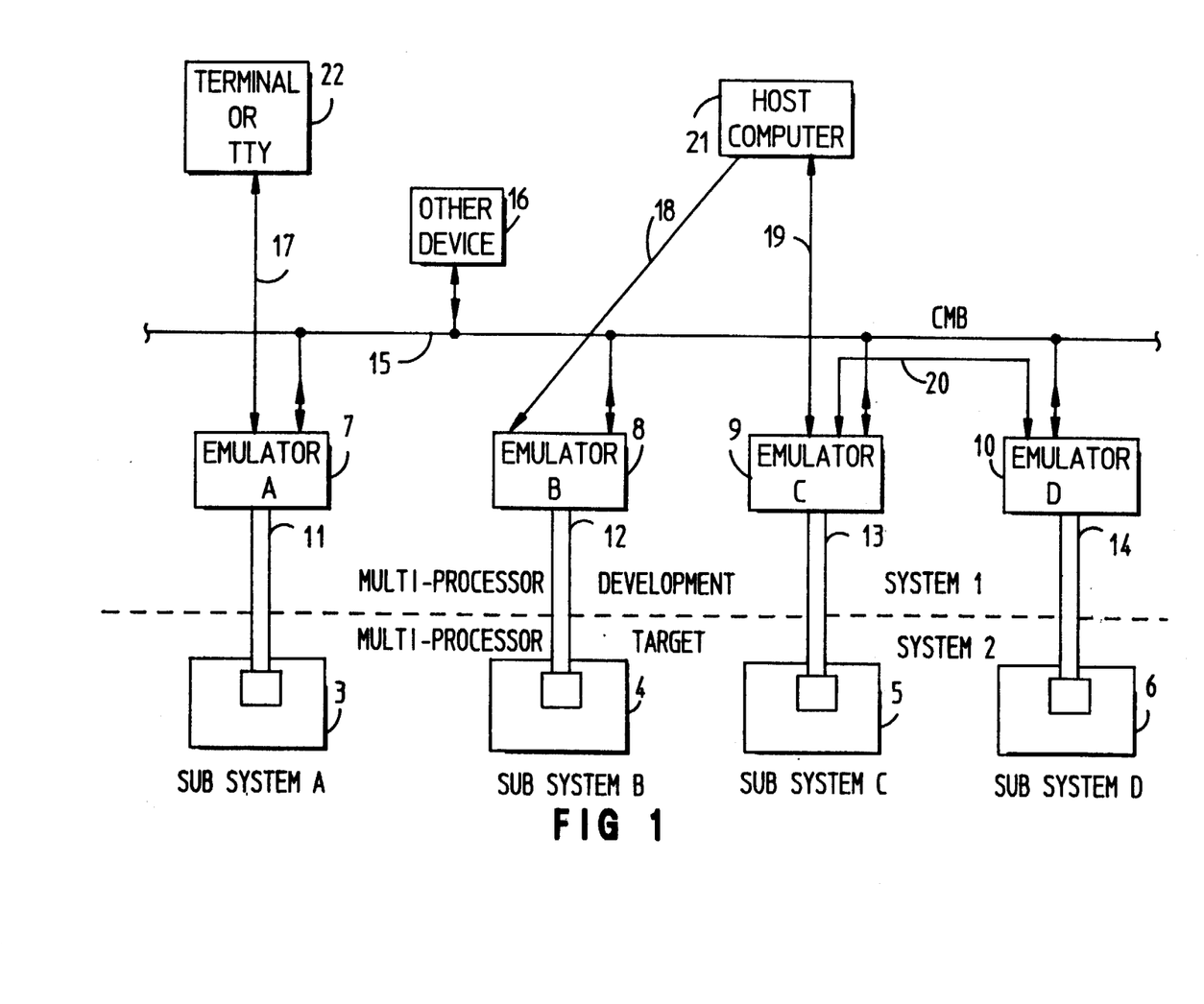
FIG. 1 is a representative block diagram of how several emulators constructed in accordance with the invention may be incorporated into a development system for a target system having a multiplicity of processors.

FIG. 1 is a simplified block diagram of a multi-processor development system 1 connected to a multi-processor target system 2. The multi-processor development system 1 may be equipment from the Hewlett-Packard 64700 Series, which is a family of emulation and analysis products. Although it is not thought to be essential to an understanding of the subject matter described herein, the interested reader desiring more background for certain related topics may find it useful to refer to the following published articles: *Host Independent Microprocessor Development System* (by Arnold S. Berger) and *Host Independent Emulator Software Architecture* (by William A. Fischer), both appearing in the December 1988 edition of the Hewlett-Packard Journal, volume 39, number 6; and *Foreground/background monitor increases development-system transparency* (by Arnold S. Berger), appearing in the February 1988 edition of PERSONAL ENGINEERING AND INSTRUMENTATION NEWS. These three articles are hereby expressly incorporated by reference.

The description that follows mentions a number of commands that may be issued to emulators and their internal analyzers. For the sake of brevity we have not included a complete recitation of the various commands and their numerous options, not even for the commands mentioned below. It is believed that those who are familiar with emulators of the type to be described will not find this inconvenient; we have not omitted that which should be known about those particular commands. However, those who do wish to obtain a complete description of all the commands, including examples for and commentary on most of them, may do so by referring to an operator's manual entitled *HP 64700 Emulators Terminal Interface: User's Reference*, which is available from Hewlett-Packard Co. under part no. 64740-90901. That *User's Reference* is hereby expressly incorporated by reference.

In FIG. 1, which is merely a representative instance of a wide variety of possible configurations, there are four subsystems A through D (3–6) each having its microprocessor replaced by an associated emulator A through D (7–10). Each emulator is connected to its associated subsystem through a cable (11–14) ending in a probe.

Each of the four emulators A-D is connected via cables (17–20) to some environment (21, 22) that serves as a source of commands and as a place to report conditions of status and send collected and analyzed data. We resist the urge to describe these connections as being for "control" of the emulators (although that is semantically correct) as we have other plans for the word "controller." To avoid confusion, let us say that these connections exist to allow the operator or user to operate, manipulate, measure and otherwise direct the activities of the various emulators, and through them, the target system.

The environment (21, 22) used to operate the combined overall system (1,2) can be as simple as a teletype or "dumb" terminal (22), or more refined, such as a special application that runs on a host computer 21. In the latter case it is likely that there would be one or more terminals (not shown) connected to the computer 21 through which persons could access the emulators. In any event, the data communications (datacom) link used over cables 17–20 to connect the emulators 7–10 to the operator(s) is standard RS-232D or RS-422. The emulators themselves understand a variety of industry standard file transfer protocols.

The emulators A-D respond to commands that are simply ASCII strings. Certain ones of these commands that are of interest will be described later. For the present, it is sufficient to note that if needed, each individual emulator can also be assigned a unique address to facilitate receiving commands carried by escape code sequences. In such a case the associated emulator then responds to commands referencing that address. An emulator can have its own direct communication link to the operator, as emulators 7 and 8 have via cables 17 and 18, respectively. Such interconnection allows an emulator to be operated directly, without resort to addressing and escape code sequences. As a convenience regarding physical layout, an emulator such as 10 can receive its communication link from another emulator 9 through a party line or pass-through arrangement, wherein an incoming datacom link 19 is used and also passed along (via 20) to another emulator. It is under these circumstances that addressing and escape code sequences are applicable. In and of itself, this mode of operation in no way subordinates the downstream emulator D to the upstream emulator C. Both emulators see exactly the same traffic originating anywhere along cables 19 and 20, and each responds as would any other emulator to commands addressed to it.

In FIG. 1 each of the emulators A-D is connected to a Coordinated Measurement Bus 15, which for brevity we shall call the CMB. The CMB 15 includes three signals of interest: CMB_EXEC, CMB_RDY, and CMB_TRIG. Included in the bus 15 are various instances of ground, which are used for signal return purposes as well as for shielding. The physical nature of the cable for the CMB 15 is a matter of choice; the present implementation is one consistent with low cost and ease of custom fabrication by the end user. Thus, what is preferred at present is a flat ribbon cable with the active signal lines separated by conductors operated at ground. The connector is a 9-pin D sub-miniature connector. In a preferred embodiment using flat ribbon cable and the 9-pin connector there can be as many as thirty-two devices connected to the CMB 15, with a maximum combined length of 150 meters of cable.

Notice how the interconnection of the CMB 15 with the emulators A–D is indicated in FIG. 1. This is deliberate, in order to avoid the suggestion of a priority-type daisy chain. What is meant is that all emulators or other devices connected to the CMB are directly connected to exactly the same instance of the CMB. As a physical matter, a single connector attached to an emulator can have two or more cable segments entering its hood, or there can be one cable segment per hood with multiple sockets for CMB cables on the emulator, with each socket being hardwired in parallel with the others. The choice is one of convenience. What is to be understood is that all devices connected to the CMB 15 have equal access thereto, and no upstream devices have any privileges over downstream devices. Notice also that some other device 16 may also be connected to the CMB 15. For example, device 16 could be some sort of user supplied test or measurement device whose inner workings are mysterious to us, but which is capable of deciding that the emulators need to be stopped. As long as the designers of that other device respect or otherwise properly interface to the CMB, that device 16 can "break" the target system or trigger other devices on the CMB, just as can the factory supplied analyzers within the emulators.

Figure 2:
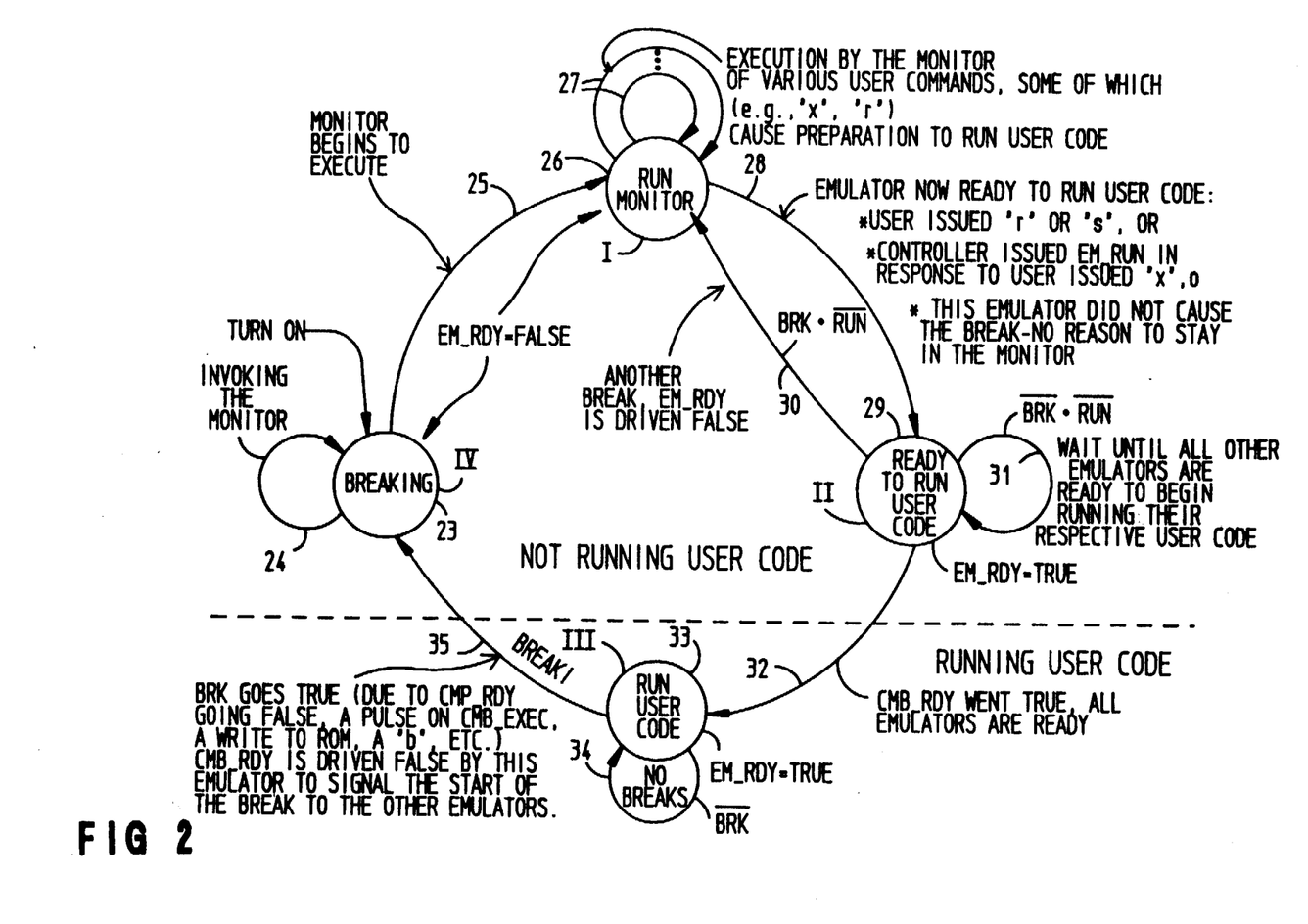
FIG. 2 is a simplified state diagram describing certain aspects of the four-state model by which an emulator in FIG. 1 transitions between running the monitor and the user's code.

Turning now to FIG. 2, that figure is a state diagram illustrating how a controller portion (to be described later) of each emulator A-D goes about transitioning between execution of the monitor and execution of the user's code, and vice versa. It is important to recognize that there are as many separate instances of this state diagram's activity as there emulators coordinating their measurements via the CMB. As shown in the figure, at turn-on a State IV, BREAKING, (23) is entered. In this state the emulator invokes the monitor. Turn-on is perhaps a special case, but even at that, the task accomplished by State IV is that of getting the monitor running. Just what kinds and how much overhead is involved here depends a lot upon whether the monitor is a foreground monitor or a background monitor. (See the incorporated article in *PERSONAL ENGINEERING & INSTRUMENTATION NEWS* for a discussion of these different types of monitors.) The duration of the task of invocation is represented by transition 24. In any event, once the monitor actually begins to execute, a transition 25 occurs into State I, RUN MONITOR (26).

While in the RUN MONITOR state 26 the emulator (which is to say, each emulator 7-10 that finds itself in its State I) executes the monitor. It is while in this state that the emulator is responsive to certain user issued instructions that change things that cannot be changed while the user's code is executing, and that the emulator will make preparations to begin to run the user's code. The various activities available to the operator while in State I 26 are indicated in general by transitions 27.

At some point each emulator needs to prepare to execute the user's code. Upon a recognition that this now needs to be done, the monitor begins to shut itself down, so to speak. It does not flush itself completely, but gets right down to the hairy edge. When this is accomplished transition 28 enters State II, READY TO RUN USER CODE (29).

A number of things can initiate this process of monitor shut-down, including a command issued by the user to either ("s") single step only this emulator or to ("r") simply begin running only this emulator's user code. Also included in the list of possibilities is that the operator issued an "x" to any emulator, signalling that all emulators are to begin, in unison, to execute their user code. This causes the emulator in receipt of the "x" to issue an instance of CMB_EXEC to *all* emulators, which in turn causes each to perform its own associated transition 28.

Another cause for transition 28 is that a first emulator was running user code, and a break occurred (someplace else). The first emulator breaks also, but only in response to the fact that some other (second) emulator felt compelled to break. (Our example here is only representative. It might have been an analyzer somewhere that initiated the break. Later it will be seen that the immediate cause is that CMD_RDY went false.) The idea is that if the second emulator had not done a break the first emulator would have continued to run its user code and not done a break, either. Under these circumstances, the first emulator does the break to honor the break caused by the second one, but immediately gets ready to run user code again (i.e., it transitions via 28 into State II). That way, as soon as any investigations or other operator actions are concluded the system is ready to resume user code execution with a minimum of instruction from the operator. In particular, and absent any other reason to do so, there is no need for the operator to expressly "restart" the first emulator; it will automatically restart in unison with the others when the operator does restart the emulator that did break.

Of course, it may happen that the operator will want to issue commands to the first emulator after the break, in spite of the fact that it was not the first emulator that initiated the break. Perhaps the user's investigations suggest a trail of culpability involving the subsystem associated with the first emulator. In this case transition 30 will restart the full monitor capability for this emulator, allowing the operator access to any emulator capabilities.

At some point, however, all but one of the emulators is ready to begin execution of its user code. While waiting for the last emulator the others wait as shown by transition 31. As each emulator enters State II (29) it ceases to keep EM RDY false. Eventually all emulators are ready, and CMB—RDY goes true. This causes a simulataneous transition 32 in all emulators in State II to State III, RUN USER CODE (33).

What happens during State III, RUN USER CODE (33), is simply that each emulator runs the user code for its associated subsystem, during which time all instances of EM—RDY remain true, allowing CMB—RDY to remain true. This state of affairs remains in effect as long as no break has occurred, as indicated by transition 34. While not suggesting that mere ongoing emulation is trivial, what is really of interest to us is what happens when a break is initiated. When an emulator does break it ceases immediately to run user code, and its state machine performs transition 35 into State IV, BREAKING (23).

A break could arise internally within a given emulator, or originate elsewhere. If it originates internally the originating emulator forces EM—RDY false just as soon as it knows that it wants to break. That causes CMB—RDY to go false, which gets all the other emulators initiating their breaks as soon as possible. If the break originates external to the emulator then its break is to honor that external break. It will commence that break when it detects that CMB—RDY went false. As part of its own break it will set its own EM—RDY false (at least until it subsequently performs a transition 28 as explained above).

Subsequent to transition 35 the emulator enters State IV, BREAKING (23). It is here that the monitor is invoked, as explained above. For as long as it takes to get the monitor going State IV performs transistion 24, followed by a transition 25 into State I, RUN MONITOR.

Having thus concluded what amounts to a quick tour around the loop in FIG. 2, it may be useful to relate the state machine of FIG. 2 to an imaginary example of operator activity for a hypothetical multi-processor target system under development.

At the beginning of the session the operator turns all the equipment on. All the emulators transition to State I and run their monitors. The operator proceeds to set up some experiment. Perhaps he needs to establish a particular state of affairs in each subsystem to simulate a certain overall condition of the whole system. To do this he first downloads all the user code, and perhaps also loads associated data into subsystem RAM. Next, he instructs a particular emulator to run its user code from a particular address, perhaps that used at turn on. To do this he issues that emulator a run ("r") command having the desired address as a parameter. None of the emulators have to this point been told to coordinate their actions via the CMB 15, so the CMB and its signals are ignored. The state machine for the commanded emulator goes from State I to State II, does not wait and transitions forthwith into State III. Thus, the commanded emulator begins running its user code as instructed. To get this subsystem stopped the operator might issue a break ("b") to its emulator, or he might have programmed a state analyzer to break (halt) that subsystem when it reaches the state of interest. This scenario is repeated for each emulator and subsystem for which predetermined conditions are to be established.

After getting all the subsystems set up the operator now wishes to turn them all loose in unison. To do this, he gives the command "cmb−e" (enable CMB) to each emulator that is to participate in the coordinated measurement. There might be one or more subsystems that need to run for the experiment to work, but that are not part of the data to be examined afterwards. Those processes might be disconnected from the CMB if desired, but might as well be connected but instructed to ignore the CMB with the command "cmb−d" (disable CMB).

At this point the operator could issue individual run ("r") commands to each emulator participating in the coordinated measurement. Each emulator so commanded performs its transition 28 from State I to State II. As the last emulator gets its run command all emulators perform transitions 32 into their State III's. The whole ensemble then begins in unison to execute user code.

Now the experiment is underway. Let's say that, after the fashion of FIG. 1, emulators A-D are coordinated by the CMB, and that after a while emulator B initiates a break. That is, owing to events internal to emulator B it performs a transition 35 from State III into State IV. The transition causes CMB—RDY to go false, which then initiates honorary breaks by emulators A, C and D. They also transition out of their States III into their States IV. As each emulator's monitor becomes active that emulator transitions into State I. Emulator B will stay there, since it knows that it originated the break. The others do not linger in State I, transitioning immediately to their State II's.

The operator then investigates what it was that made emulator B break. Satisfied, he issues a run command to emulator B. Since the other emulators are already waiting in their State II's, all four emulators will transition to State III and commence user code execution in unison once emulator B gets to its State II. Note that all that is necessary is the single run command to just the one emulator that initiated the break. this mode of operation corresponds to a run, pause, run, pause, run . . . type of operation.

Now suppose that B breaks again, unexpectedly. The other emulators then also break again, as described above. More suspicious this time about what's really going on, the operator not only investigates B, but while A is in its State II, investigates that subsystem also. Commands are issued to A as part of the investigation. The first command to A's monitor causes A to perform a transition 30 from its State II into State I. While in state I the investigation is undertaken, followed perphaps by the installation of some patches in the user code. Now A is commanded to run, and goes back to its State II. Now B is commanded to run, and all emulators begin again in unison to execute user code.

However, the operator has misapprehended the situation; nothing of interest is happening. It is time to try something new. He issues a break command ("b") to the nearest or most conveniently located emulator. This causes that emulator to break, subsequently causing all the others to break, also. What the operator has in mind now is setting up different starting conditions for each of the emulators, and then repeatedly starting a test from those initial conditions. To do this he uses separate instance of the run-at-execute command ("rx<parameter>") to enter an execute specification into each emulator. This specification may include a starting address at which an emulator is to begin the execution of the user's code, initial register contents, and perhaps initial values for other variables. In the absence of such an express specification, the default specification is simply to begin execution at the next location following the one where the break occurred. The "rx" command does not cause a transition out of State I.

Once the necessary execute specifications have been entered, he need only give any one of the emulators an execute command ("x"). The emulator that receives this command responds to it issuing a pulse on CMB—EXEC. This same emulator, and all the others, then responds to the pulse on CMB—EXEC by first implementing its associated execute specification, followed by transitioning to State II. When they all get there, they then each transition in unison to State III, whereupon each begins to execute its user code.

In this example the execute command was issued after the emulators have done a break, with one of them in State I and the others in State II. It is important to note that the execute command will be effective regardless of the State that the emulator's state machine is in. If, for example, it were in State III, the execute command would cause a break, leading eventually to State I and the activity described above. If it were in State IV already or in State II, it still goes to State I where it will discover that an execute command has been issued (how this happens is described in connection with FIG. 3) and respond accordingly.

Having given "x" the operator discovers that emulator A breaks. He investigates subsystem A, patches the code, and tries the test again simply by issuing another "x". The patch fails, and the process is repeated until finally there is no longer a break. Still, something is amiss; either the system is out to lunch or something is not correctly set up. There should be a whirring of motors and some flashing lights in the target system. After a moment of exasperated investigation it is discovered that an assistant has failed to turn on the power to the servo motors. The power is turned on, but this is impolite as far as the target system's firmware is concerned. The current experiment simply needs to be restarted with the power turned on. The operator issues a reprimand to the assistant and an "x" to the nearest emulator.

Now the target system is displaying appropriate behavior. It goes through a particularly interesting sequence with the motors. The system is still running, but everybody wants to watch that particular sequence again. It is not necessary to expressly halt the target system; all that is necessary is to give any emulator an "x" command. This will automatically break all the emulators, re-establish each emulator's execute specification, and then restart all emulators.

It is possible to issue an "rx <parameter>" command to any emulator at any time, even though that emulator might be running user code. To do so does change the execute specification, but does not cause a break.

Now let's suppose that another circumstance has arisen. It has been determined that a break should occur when subsystem D experiences a certain event, but that for reasons of safety or practicality, only subsystems A-C should break, and subsystem D should continue to execute. This, too, is easily arranged. Emulator D is commanded to ignore the CMB, by issuing it the command "cmb—d" (disable CMB). But the analyzer for subsystem D is programmed to trigger on the desired event of interest. The trigger signal ($\overline{\text{CMB—TRIG}}$) is part of the CMB. The other emulators A-C are now instructed to include the instance of a trigger signal on $\overline{\text{CMB—TRIG}}$ as a cause for initiating a break. Under these circumstances, detection of the event of interest by D's analyzer causes emulators A-C to simultaneously break, while D continues to execute. If only one of emulators A-C were programmed to break, the others would still break, too (to honor the break by A), but perhaps after a slight delay.

The $\overline{\text{CMB—TRIG}}$ signal can also be used to cross trigger the various analyzers in the system.

Just as the "rx" command establishes initial execute specifications for emulators, which are then enforced upon receipt of an "x", there is a "tx" command to establish initial conditions for analyzers. This allows an analyzer to automatically restart as the target system is being restarted, all in response to an "x". The analyzer restart is completed prior to when the emulator restart results in execution of user code.

Figure 3:
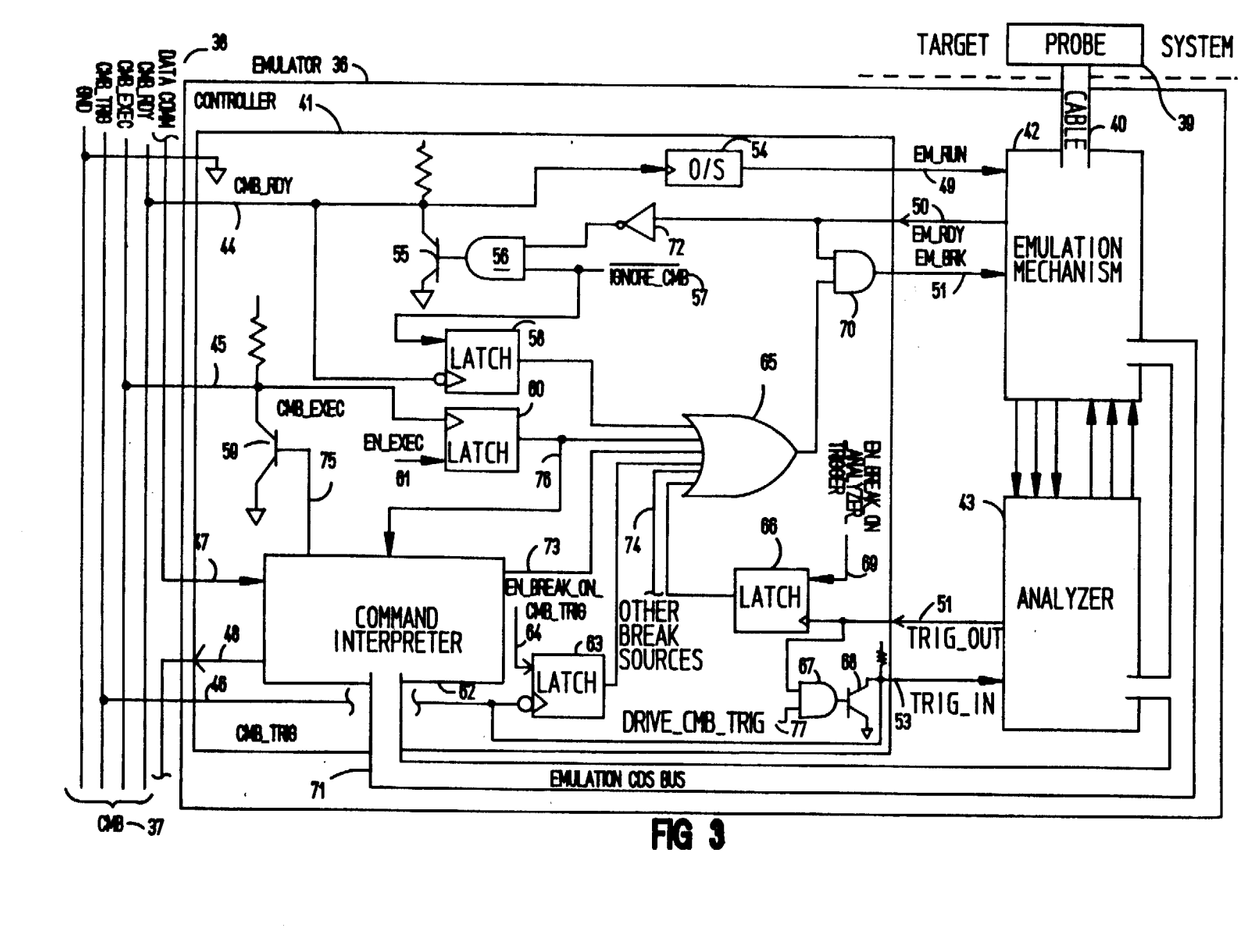
FIG. 3 is a simplified block diagram of an emulator of FIG. 1.

FIG. 3 is a simplified block diagram of one of the emulators A-D in FIG. 1. In FIG. 3 an emulator 36 is shown as comprising a controller 41, an emulation mechanism 42, and an internal analyzer 43. It should be understood that while a built-in analyzer is a valuable and traditional part of an emulation system, its presence is not necessary for the operation of the invention. The emulation mechanism 42 includes the substitute microprocessor surrounded by suitable circuitry referred to in the background, and is coupled to the target system by a flexible cable 40 having a suitable probe 39 at a distal end. The emulation mechanism is also coupled to the internal analyzer 43. The emulation mechanism and the internal analyzer are coupled by various control lines to the controller 41, which is in turn coupled to the CMB 37 (corresponding to 15 in FIG. 1) and to a datacom line 47, 48 (corresponding to 17-20 of FIG. 1).

The purpose of the controller 41 is to supervise the operation of the emulation mechanism 42 and the internal analyzer 43. To this end it is responsive to instructions directed to it via the datacom line 47. If Emulator 36 of FIG. 3 were being used in a pass-through mode, such as emulator C of FIG. 1, then the downstream emulator would receive line 48 as its datacom. Otherwise, line 48 may be omitted. The controller 41 is also coupled to the individual signals within the CMB 37. These are CMB—RDY 44, CMB—EXEC 45, $\overline{\text{CMB—TRIG}}$ 46, and a signal ground. (Actually, in the preferred embodiment the CMB signals are carried by a flat ribbon cable; there are four grounds with the three control signals interleaved between them.)

We are most interested in the way the controller 41 supervises the emulation mechanism 42 and the internal analyzer 43 when emulator 36 is participating in a measurement coordinated by the CMB. This aspect of supervision requires very high speed action, and is produced by dedicated circuitry (to be described) involving the signals EM_RDY, EM_RUN and EM_BRK. When non-participation is desired the controller 41 is still supervises, but without coordination via the CMB 37. A command interpreter 62 establishes whether or not its emulator is to participate via the CMB, and if so, to what degree.

In general, the command interpreter serves as the "brains" of the controller. A complete embedded system (not shown) with RAM, ROM and a microprocessor resides within the command interpreter 62. The command interpreter 62 interacts with the emulation mechanism (and the analyzer, too) via an emulation command/data/status bus 71 (the CDS bus). The CDS bus allows considerable and complex interaction, although at longer response times. CDS bus traffic plays an important role in supervising the operation of the emulation mechanism 42, regardless of whether or not measurements or being coordinated by the CMB.

To achieve coordination among emulators on the CMB the controller 41 must perform certain major functions that implement the state diagram of FIG. 2. These major functions include: detecting breaks begun by its associated emulation mechanism 42 and forcing CMB_RDY false to thus inform the other emulators so that they may break in sympathy; observing CMB_RDY to determine when another emulator has initiated a break, and then honoring that break by initiating a break in its associated emulation mechanism 42; and, observing CMB_RDY to participate in coordinated starts (of running user code). These basic functions are extended in various ways by the other CMB signal lines CMB_EXEC and $\overline{\text{CMB_TRIG}}$. These extensions will be discussed in due course, following an explanation of the basic functions connected with CMB_RDY 44.

Very generally, the controller 41 responds to various signal events on the CMB 37 by asserting various corresponding emulation mechanism and analyzer control signals that are not part of the CMB per se, but that produce certain corresponding functions or conditions. Going the other direction, the controller detects certain events or conditions in the emulator mechanism and internal analyzer and maps these into signal events asserted on the CMB. We turn now to an explanation these relationships established by the controller 41.

To begin the explanation, assume that the emulator 36 is in state I of FIG. 2. In a preferred embodiment there actually is a state machine that is in a corresponding state. In that preferred embodiment that state machine is located within the emulation mechanism. It receives EM_RUN, EM_BRK and certain control signals on the CDS bus as input state variables. Its principal outputs are the signal EM_RDY and a status signal indicating the status of the monitor. Once in State I the state machine remains in that state until it is instructed by the command interpreter (via the CDS bus) to leave it for State II. While in State I the state machine drives EM_RDY false. If the emulator 36 is participating in a measurement coordinated by the CMB the signal IG-NORE_CMB will be false (this is controlled by the command interpreter), allowing EM_RDY, via AND gate 56 and transistor 55, to force CMB_RDY false. This assists other emulators along the CMB in transitioning around their state machines. In due course we shall see how this works, when the present emulator gets into States II or III.

The state machine transitions into State II upon: (1) the appearance of an appropriate signal upon the CDS bus, indicating that the user has, for example, issued a run command ("r"); and (2), the monitor has done all that it needs to in order to conclude itself, and it now in a very tight software loop that checks only the signals EM_RUN and EM_BRK. The output of State II is the signal EM_RDY, which after inversion by invertor 72 forces the output of AND gate 56 low, turning off transistor 55 and allowing CMB_RDY to go true as soon as every other emulator agrees. Meanwhile, CMB_RDY probably stays false for some additional period of time. During that additional period of time the state machine stays in State II, waiting for one of two things. Either there will be another break or CMB_RDY will go true.

A break at this time could originate from a number of different sources, with perhaps the most likely being further instructions being issued to this emulator by the operator. However, the indication that a break is needed could also arrive over the CMB via $\overline{CMB\_TRIG}$ or CMB_EXEC. However it originates, this break causes a corresponding signal at the input of OR gate 65, whose output in turn passes through AND gate 70 (EM_RDY is true, remember) to produce EM_BRK. EM_BRK causes the state machine to transition back to State I. The monitor, which has been watching for EM_BRK, branches out of its tight loop, and restarts itself.

CMB_RDY it goes true when all of the emulators have released it. The appearance of CMB_RDY causes one-shot 54 to produce a pulse on EM_RUN. This is one of the two signals being tested for in the tight loop mentioned above. When EM_RUN is detected it causes the emulation microprocessor (not shown) within the emulation mechanism 42 to branch to a particular address. A circuit (not shown) detects an instruction fetch from that particular address and prepares to switch from executing code in the monitor's memory address space to executing in the memory address space containing the user's code. The circuit performs the switch very quickly upon the conclusion of the fetch, so that the emulation microprocessor just keeps on executing code without any delay. The instruction fetched from the particular address is generally a jump instruction to the desired starting address in the user's code. This starting address gets into the particular address as a result of the execute specification mentioned previously.

The state machine responded to the pulse on EM_RUN by transitioning to State III, where its output is a continued issuance of EM_RDY.

Once in State III the state machine stays there until EM_BRK goes true, which will cause a transition to State IV. Several things can cause a break, which will in turn produce EM_BRK. Among these are CMB_RDY going false, a pulse on either of CMB_EXEC or $\overline{CMB\_TRIG}$, or a pulse on the TRIG_OUT 51 from the internal analyzer 43. Each of these causes for a break has an associated signal, which is applied to an associated latch (58, 60, 63 and 66). Each latch has an associated enable signal (57, 61, 64 and 69). If the appropriate enable signal is true the latch associated with the cause of the break is set, producing an output that is applied to OR gate 65. From there, AND gate 70 produces EM_BRK. The purpose of the latches is to allow the command interpreter to later capture the reason for the break. Although for the sake of brevity it is not shown in FIG. 3, the command interpreter can interrogate each latch, and at the appropriate time, clear each latch.

The enable signals for the latches originate in an enable register (not shown) within the command interpreter. Each bit in the enable register controls a different enable signal. The operator can instruct the command interpreter to produce any desired pattern of bits in the enable register, thus controlling just which kinds of breaks the emulator 36 will honor by actually breaking. Note however, that the command interpreter has an output 73 that is applied to OR gate 65. This source of break corresponds to a break command ("b") received via the datacom (38, 47). No enabled latch is necessary for this cause of a break to be honored.

Note also that an additional input 74 is shown for OR gate 65. This input is for any other sources of breaks that are to be honored. No associated latch is shown for this signal; it is assumed that any enabling of this signal is performed at its source.

Upon the generation of EM_BRK the state machine transitions to State IV. The output of State IV is a false EM_RDY. This immediately drives CMB_RDY false, so that other emulators may honor this emulator's (36) break. The state machine stays in State IV until the monitor is again functional, whereupon the State machine will transition back to State I. The transition to State IV is decoded within the emulation mechanism and used to switch the emulation microprocessor back to executing code from the monitor's memory space. The monitor is restarted from what amounts to a turn-on sequence, which saves all the information of interest about conditions within the user code at the time of the break. Following this the monitor goes into an idle loop from which it responds to instructions sent to it from the command interpreter via the CDS Bus. The execution of the idle loop is detected within the emulation mechanism and used to cause the state machine to transition into State I. This decoding also produces a result that is visible on the CDS bus, which informs the command interpreter that the monitor is ready to respond to commands.

At this point the command interpreter interrogates the latches to determine the cause of the break. If the break originated externally by CMB_RDY going false or with an instance of CMB_EXEC then the command interpreter will instruct the state machine via the CDS bus to leave State I and begin the process of transitioning to State II. For all other causes of a break the command interpreter declines to immediately issue further instructions, leaving the state machine in State I.

If the emulator 36 is issued an execute command ("x") via the datacom the command interpreter will through line 75 issue a pulse to transistor 59. This cycles the CMB—EXEC line 45, which will in turn set latch 60 provided EN—EXEC 61 is also true. The cycling of CMB—EXEC also sets every enabled latch 60 in every other emulator. Thus, sending an excute command to any receptive emulator will cause it and all other emulators receptive to CMB—EXEC to break.

The execute command involves one other mechanism. Note line 76 leading from the output of latch 60 to the command interpreter. This line is not part of the interrogation mechanism for determining the cause of a break; those lines are not shown. Instead, line 76 serves to cause an interrupt to the microprocessor within the command interpreter. The purpose of the interrupt is to ensure that the command interpreter finds out that the CMB—EXEC line has cycled. This mechanism is needed for the following reasons. Suppose the state machine was already in State I when the cycle occurred, or that it was in State IV, but *after* the command interpreter has interrogated the latches to learn the cause of the break causing the transition into State IV. In the latter case latch 60 would get set after it was already checked. In the former case the cycle on CMB—EXEC would get lost because there is no way to re-initiate a break while in State I. That *is* the state, after all, that represents the duration of a break. (This anomaly does not arise while in States II and III. Then the cycle on CMB—EXEC would cause a break, and would be handled properly.) Upon receipt of the interrupt on line 76 the command interpreter will, as soon as the state machine reaches State I, or if it is already there, immediately, institute the execute specification, and then issue the command to suspend the monitor and transition to state II. Otherwise the state machine could incorrectly linger in State I or fail to enter State II with the proper execute specification instituted.

Note that the signal TRIG—OUT 51 from the internal analyzer 43 may be selectively enabled to allow it to drive CMB—TRIG. This is arranged by AND'ing TRIG—OUT with an enable signal DRIVE—CMB—TRIG. The result of that operation is applied to transistor 68. If DRIVE—CMB—TRIG is true (as determined by the enable register within the command interpreter) then TRIG—OUT can drive CMB—TRIG; otherwise, it can't. This configurability is useful in establishing flexible triggering schemes, and sometimes in preventing unstable or oscillatory behavior amongst the devices generating triggers and being triggered.

Finally, FIG. 3 may be used to explain hoe the CMB—TRIG line is used to achieve a synchronous start of all the internal analyzers subsequent to an execute command, as was mentioned in the next to last paragraph of the Summary of the Invention. In further response to a cycle on CMB—EXEC the command interpreter first determines if the internal analyzer 43 has been given a trace-at-execute command ("tx"). If it has, then the command interpreter sets EN—BREAK—ON—CMB—TRIG 64 and EN—BREAK—ON—ANALYZER—TRIGGER 69 false, and sets DRIVE—CMB—TRIG 77 true. It next instructs the analyzer (via the CDS bus) to stop listening to TRIG—IN 53 and start asserting TRIG—OUT 51. The command interpreter now uses the CDS bus to establish the trace-at-execute specification for the internal analyzer. After this is accomplished the command interpreter instructs the analyzer to begin running when CMB—TRIG goes false. The analyzer is then told to stop asserting TRIG—OUT. The command interpreter then restores the enable signals 64, 69 and 77 to their former values. When all of the internal analyzers have been so prepared to trace and have thus released CMB—TRIG, it goes false (high). This starts all of the analyzers running, and CMB—TRIG reverts to its normal meaning.

Figure 4:
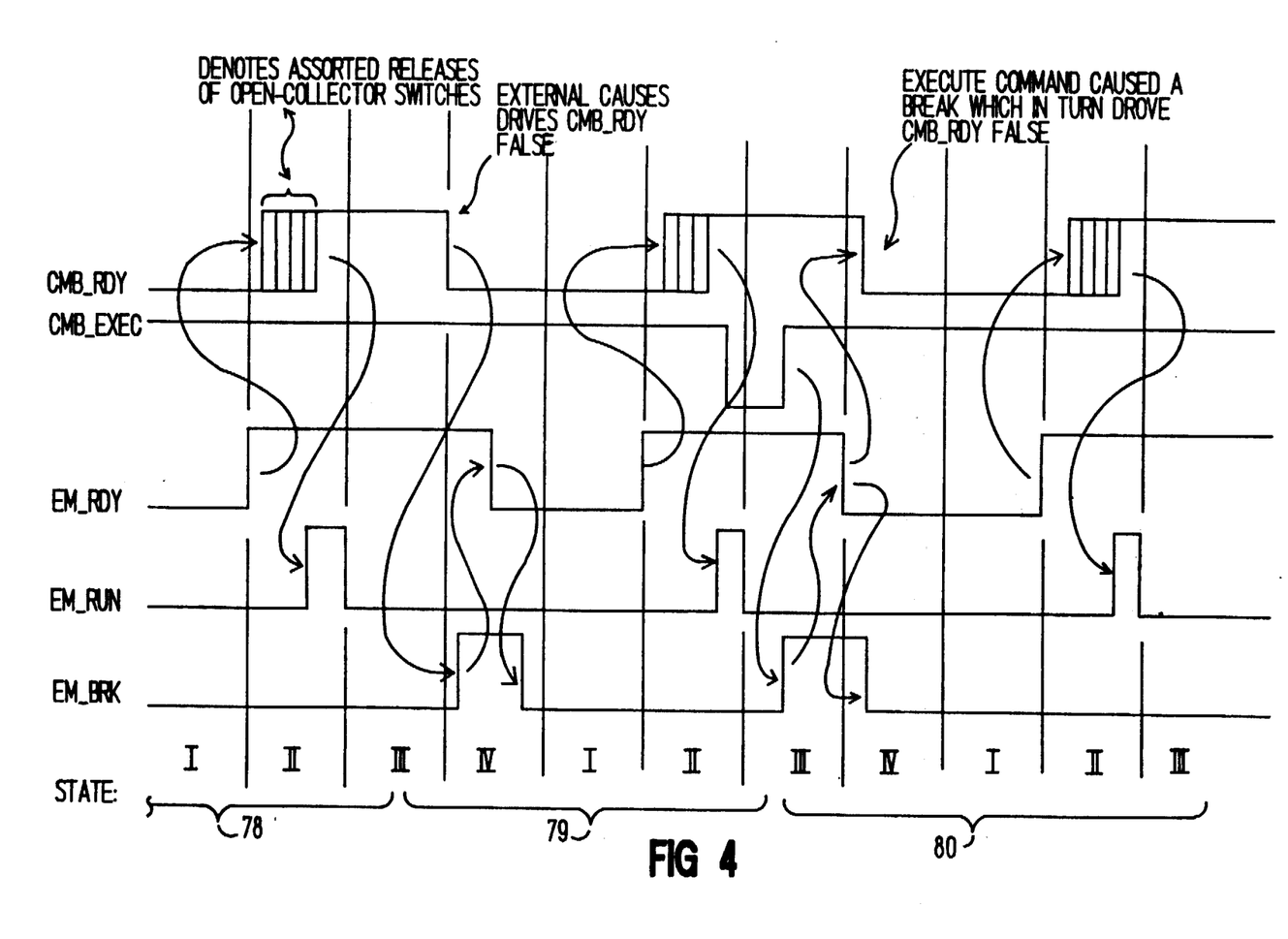
FIG. 4 is a relational timing diagram illustrating the cause and effect relationships between various signals on the CMB and transitions in the four-state model for breaking and resuming the execution of user code.

Refer now to FIG. 4, which illustrates one partial cycle 78 of activity for the state diagram of FIG. 2, and two complete cycles 79, 80. The heavy arrows within the timing diagram illustrate various cause and effect relationships. The first cycle 78 might represent turn-on, followed by beginning to run user code. The second cycle includes a break performed by a particular emulator (the one whose EM—RDY, etc., signals are shown in the figure) say, to honor a break occurring on another emulator; actually, anything external to this emulator might be responsible for initiating its break. The next cycle 80 represents an instance of the execute command. (Recall that the execute command causes a pulse on the CMB—EXEC line.)

To conclude, refer again briefly to FIG. 1. While the overall discussion to this point has implicitly assumed that the emulators A-D are separate stand-alone instruments, they may also be mechanisms that are integrated into a larger system. And although it is not shown, there is no reason why each of the emulators A-D could not be connected to yet another bus. What it important is how the emulators coordinate their activity, not how they are physically packaged.

Referring again to FIG. 2, the preferred embodiment has been explained assuming that when not running user code the emulation microprocessor within the emulation mechanism 42 would execute a firmware or software monitor. The invention does not require this particular method of achieving the functions afforded by the monitor. As an alternative, the functions of the monitor could be a mixture of code executed by the emulation microprocessor and hardware surrounding the emulation microprocessor. The functions of the monitor could even be performed entirely by hardware surrounding the emulation microprocessor, or depending upon the processor, by the circuitry within the processor itself. These other possibilities would still cooperate essentially as explained. In particular, the four-state model of FIG. 2 would still apply. When considering FIG. 2, think of the monitor as a collection of operations that can be performed upon the emulation microprocessor, and not necessarily as an executable program.

We claim:

1. A method of simultaneously beginning the execution of user code upon a plurality of emulators, the method comprising the steps of:

(a) connecting a respective synchronization signal terminal on each emulator to a common conductor;

(b) coupling at least one pull-up resistance between the common conductor and a source of voltage $V_t$ representing a logically true condition, such coupling being adequate, in the absence of any other coupling to a different voltage, to pull the common conductor up to $V_t$;

(c) executing a respective monitor program on each emulator;

(d) within each emulator as a response to its respective instance of step (c), connecting the synchronization terminal of that emulator to a source of voltage $V_f$ representing a logically false condition, such connecting within any one of the emulators being sufficient to pull the voltage on the common conductor down to $V_f$ from $V_t$;

(e) signalling each emulator to cause the respective monitor program to prepare but to not quite begin to run user code;
(f) within each emulator disconnecting the respective synchronization terminal thereof from the voltage $V_f$ upon completion of that monitor's preparations began in response to step (e);

(g) detecting within each emulator that the voltage upon the common conductor has pulled up to $V_f$;
(h) responding within each emulator to step (g) by falling through a final portion of the respective monitor to begin execution of the respective user code.

* * * * *